US 6,596,036 B2

(12) United States Patent
Derksen et al.

(10) Patent No.: US 6,596,036 B2
(45) Date of Patent: Jul. 22, 2003

(54) METHOD FOR THE PRODUCTION OF A DYE PREPARATION BASED ON MADDER ROOT

(75) Inventors: Goverdina Christina Helena Derksen, Wageningen (NL); Teris André Van Beek, Opheusden (NL); Aede De Groot, Wageningen (NL); Anthony Capelle, Amerongen (NL)

(73) Assignee: Coöperatie Rubia U.A. (NL)

( * ) Notice: Subject to any disclaimer, the term of this patent is extended or adjusted under 35 U.S.C. 154(b) by 0 days.

(21) Appl. No.: 09/963,137

(22) Filed: Sep. 25, 2001

(65) Prior Publication Data

US 2002/0083533 A1 Jul. 4, 2002

(30) Foreign Application Priority Data

Sep. 26, 2000 (EP) ............................................ 00203307

(51) Int. Cl.⁷ ........................... C07B 61/00; C07B 1/02; C07B 1/16; A61K 7/06; A61K 35/00
(52) U.S. Cl. ...................... 8/646; 8/676; 8/636; 8/401; 424/74; 424/123; 552/208; 552/210; 514/783
(58) Field of Search ...................... 424/74, 123; 8/646, 8/675, 636, 401; 514/783; 552/208, 210

(56) References Cited

U.S. PATENT DOCUMENTS

| 4,156,077 A | * | 5/1979 | Pifferi | 536/4 |
| 5,042,989 A | * | 8/1991 | Eck | 8/438 |
| 5,403,362 A | * | 4/1995 | Gurley | 8/618 |
| 5,509,941 A | * | 4/1996 | Gurley | 8/625 |
| 5,651,795 A |   | 7/1997 | Gurley | 8/599 |
| 5,700,464 A | * | 12/1997 | Silver | 424/123 |
| 5,891,433 A |   | 4/1999 | Silver | 424/123 |

FOREIGN PATENT DOCUMENTS

| EP | 0 754 734 A1 | 1/1997 | ........... C09B/61/00 |
| FR | 2 483 226 | 12/1981 | ........... A61K/7/13 |
| GB | 2 093 868 A | 9/1992 | ........... A61K/7/13 |

OTHER PUBLICATIONS

Brown et al., Education in Chemistry, (1999), 36(1), 20–22.*

Oenal, Adem (DN 125:331406, HCAPLUS, abstract of Turkish J. of Chem., (1996), 20(3), 204–213).*

Kinooka et al. (DN 120:161691, HCAPLUS, abstract of J. of Fermentation and Bioengineering (1994), 77(1), 103–6).*

* cited by examiner

Primary Examiner—Sabiha Qazi
(74) Attorney, Agent, or Firm—Webb Ziesenheim Logsdon Orkin & Hanson, P.C.

(57) ABSTRACT

The present invention relates to a method for the production of a dye preparation from madder root, comprising extraction of madder root in water at a temperature below 70–75° C., preferably below 65° C., while providing oxygen to the reaction mixture of madder root in water to obtain the dye preparation and to the dye preparation thus obtained.

17 Claims, No Drawings

METHOD FOR THE PRODUCTION OF A DYE PREPARATION BASED ON MADDER ROOT

FIELD OF THE INVENTION

The present invention relates to a method for the production of a dye preparation from madder root.

The root of the madder plant (*Rubia tinctorum*) contains various dyes among which is alizarin or 1,2-dihydroxyanthraquinone. Alizarin occurs in the fleshy roots as its glycoside, ruberythric acid. The roots have long been a major source of the alizarin dye until it was discovered in 1868 that it can also be chemically synthesized. The chemical synthesis is however becoming more and more expensive and is less desirable from an environmental point of view. Therefore, the madder root was again considered as a useful alternative for the preparation of the dye.

BACKGROUND OF THE INVENTION

The roots in themselves contain only minor amounts of the dye alizarin. For the formation of alizarin, it is necessary to hydrolyse ruberythric acid, i.e. cleave off the disaccharide group. The roots in addition comprise another glycoside, namely lucidin primeveroside, which contains the same disaccharide as ruberythric acid. During hydrolysis of ruberythric acid lucidin can be formed out of lucidin primeveroside. Lucidin is, however, a known mutagenic agent. Its formation is thus to be avoided.

The hydrolysis of ruberythric acid to alizarin can be done via various routes, namely by means of a strong acid (such as $H_2SO_4$), a strong base (such as KOH) or hydrolysis enzymes (so-called hydrolases).

The present inventors have first tested all these methods and came to the following conclusions.

When a suspension of dried roots of madder is refluxed in aqueous 2% $H_2SO_4$ solution, this leads to the formation of alizarin, purpurin and xanthopurpurin as the main anthraquinone components and in addition some minor unidentified compounds. Lucidin primeveroside disappears, but it is not known what happens with it.

When a suspension of dried roots of madder in water is refluxed in 2% KOH, alizarin and a broad range of minor components, predominantly anthraquinones, are formed. Because these components are not all identified it is unknown whether mutagenic compounds are present.

According to the literature (T., Masawaki, M. Taya, S. Tone (1996) Selective solvent extraction of ruerythric acid from madder roots and subsequent hydrolysis with β-glucosidase, Journal of Fermentation and Bioengineering 81 (6): 567–569), hydrolysis of the glycosides of madder with β-glucosidases should lead to the formation of alizarin and lucidin. The present inventors have repeated the experiment but did not succeed in obtaining alizarin and lucidin. Using commercially available enzyme preparations containing xylenase and glycosidase activity on a madder suspension (in which endogenous madder enzymes were inactivated) did lead to alizarin and lucidin. But this method is not suitable either because it would need an additional step to get rid of the mutagenic lucidin.

SUMMARY OF THE INVENTION

It is therefore the object of the present invention to provide a new method for producing a dye preparation from madder root, in which preparation the amount of the dye alizarin is increased but which method does not lead to the formation of the mutagenic by-product lucidin in the preparation.

This is achieved by the invention by a method, comprising extraction of madder root in water at a temperature below 70–75° C., preferably below 65° C., while providing oxygen to the reaction mixture of madder root in water. In the research that led to the present invention it was established that the hydrolysis of ruberythric acid can be performed by endogenous madder root enzymes. In this enzymatic process also nordamnacanthal is formed out of lucidin primeveroside. It was found that when insufficient or no oxygen is present lucidin is formed instead of the harmless nordamnacanthal. Thus, for avoiding the formation of lucidin, the presence of oxygen is mandatory.

The present invention is a method, comprising extraction of madder root in water at a temperature below 70–75° C., preferably below 65° C., while providing oxygen to the reaction mixture of madder root in water. In the research that led to the present invention it was established that the hydrolysis of ruberythric acid can be performed by endogenous madder root enzymes. In this enzymatic process also nordamnacanthal is formed out of lucidin primeveroside. It was found that when insufficient or no oxygen is present lucidin is formed instead of the harmless nordamnacanthal. Thus, for avoiding the formation of lucidin, the presence of oxygen is mandatory.

It was found that the conversion of the dye components in madder roots by endogenous enzymes is optimal when the temperature lies between 35 and 65° C. at a reaction time of about 30 minutes. At higher reaction times of for example 4 hours, the temperature may be even lower, to as low as 0° C.

Because the conversion of lucidin primeveroside is enzymatic it is important to keep the reaction temperature below a value that would lead to denaturation of the enzymes. Preferably the temperature is kept below 65° C. At a higher temperature, the enzymes start to be denatured. Although the reaction will still go on for some time, the conversion is not complete and therefore not useful for the preparation of the dye.

It was found that the transformation of ruberythric acid and lucidin primeveroside into alizarin and lucidin, respectively, can be performed in demiwater, ultra-pure water and even tap water. The optimum pH range varies with the extraction time. The optimum pH for 30 minutes reaction time is about 6. At higher and lower pH's the percentage conversion lowers rapidly. At 4 hours the pH optimum lies between 6 and 8.

The provision of oxygen can be achieved by simple stirring of the reaction mixture or the more direct introduction of air or oxygen into the reaction mixture. It is preferred to enrich water to be used in the reaction with oxygen prior to the addition of the madder. It is furthermore preferred to also add oxygen during the addition of the madder and during the reaction. The availability of oxygen can be improved by increasing the contact area of the reaction water with the surrounding air or added oxygen.

The absence of lucidin in the final product can be confirmed by means of HPLC.

The term "madder root" as used in this application refers to any from of madder root, such as fresh roots, dried roots, root powder etc.

The present invention is further illustrated in the following examples.

EXAMPLES

Example 1
Extraction of Alizarin

The roots of madder are dried and grinded. 2.5 Gr of this powder is suspended in 100 ml water. The extraction mixture thus obtained is stirred for at least 30–45 minutes at 45° C. or at least 30–90 minutes at room temperature. A sample of the extraction mixture is diluted 10 times and analyzed by HPLC. The mixture was found to contain the following constituents: the carboxylic acids pseudopurpurin (PP) and munjistin (MJ), alizarin (ALI), purpurin (PUR), a small amount of rubiadin (RUB) and nordamnacanthal (NOR). Thus, ruberythric acid (RZ) is converted into alizarin (ALI). Lucidin primeveroside (LP), however, is not converted into lucidin (LUC) as would be expected, but into nordamnacanthal (NOR).

Example 2
The Hydrolysis is Enzymatic

In order to demonstrate that the hydrolysis is an enzymatic reaction, the following experiments were performed.
1. refluxing of madder powder in water of 100° C. does not lead to the formation of ALI and NOR
2. stirring of madder powder in a 1:1 mixture of water and ethanol at 45° C. does not lead to formation of ALI and NOR
3. no ALI and NOR are formed when madder powder is stirred in alkaline water of pH 10 at 45° C.

This confirms that the reaction is enzymatic as inactivation of endogenous enzymes by means of a high temperature, a high amount of ethanol or a high pH does not lead to the end products of the hydrolysis reaction.

Example 3
A Separate Enzyme is Necessary for the Conversion of Lucidin

In order to establish whether only one enzyme is responsible for the conversion of LP to LUC to NOR or whether the first step is performed by a hydrolase and the second step by a oxidase the following experiments were performed.
Experiment 1

Madder powder is stirred in water for 1 hour under a nitrogen atmosphere in a closed reaction vessel. After 1 hour the vessel is opened and nitrogen is replaced by air. Stirring is continued for 6 hours.

After analysis of the reaction mixture it follows that within 60 minutes all LP is converted into LUC. After the reaction vessel is opened, LUC is converted into NOR, a step which takes 6 hours. When oxygen is present LUC can not be detected, which means that its conversion is much faster than in the present experimental situation. It is assumed that the difference in reaction speed is caused by the fact that LUC is not soluble in water. Therefore, it is in general difficult for the enzyme to oxidize the solid LUC to NOR. However, when the reaction is performed under oxygen LUC cannot crystalize, because it is immediately oxidized to NOR. NOR is also insoluble in water.

Experiment 2

To demonstrate that the conversion of LUC into NOR is enzymatic, the previous experiment was repeated, but before opening the reaction vessel the reaction mixture was heated to 100° C. to inactivate any enzymes that might be present. After stirring it was found that no LUC was converted into NOR. Thus, the presence of oxygen alone is not sufficient for the formation of NOR.

What is claimed is:

1. A method for the production of a dye preparation from madder root, comprising extraction of madder root in water at a temperature below 75° C., while providing oxygen to the reaction mixture of madder root in water to obtain the dye preparation.

2. The method as claimed in claim 1, wherein the extraction is performed at a temperature between 0 and 65° C.

3. The method as claimed in claim 1, wherein the extraction is performed in 4 hours.

4. The method as claimed in claim 1, wherein the extraction is performed at a temperature between 35 and 65° C.

5. The method as claimed in claim 4, wherein the extraction is performed in 30 minutes.

6. The method as claimed in claim 1, wherein the oxygen is provided by stirring the reaction mixture.

7. The method as claimed in claim 1, wherein the oxygen is provided by introduction of air into the reaction mixture.

8. The method as claimed in claim 1, wherein the oxygen is provided by introduction of oxygen into the reaction mixture.

9. The method as claimed in claim 1, wherein the extraction is performed at a pH between 6 and 8.

10. The method as claimed in claim 9, wherein the extraction is performed in 4 hours.

11. The method as claimed in claim 1, wherein the extraction is performed at a pH of about 6.

12. The method as claimed in claim 11, wherein the extraction is performed in 30 minutes.

13. The method as claimed in claim 1, wherein the madder root that is extracted is in a dried and powdered form.

14. The method as claimed in claim 1, wherein the extraction is performed over a period of at least 30–45 minutes at a temperature of 45° C.

15. The method as claimed in claim 1, wherein the extraction is performed over a period of at least 30–90 minutes at room temperature.

16. The method as claimed in claim 1, further comprising the step of isolating alizarin out of the dye preparation.

17. A dye preparation obtainable by the method as claimed in claim 1.

* * * * *